(12) United States Patent
Xuan et al.

(10) Patent No.: US 9,404,685 B2
(45) Date of Patent: Aug. 2, 2016

(54) WATER REMOVAL AND HEAVY-HYDROCARBON REMOVAL PROCESS IN LIQUEFIED NATURAL GAS PRODUCTION FROM MIXED GAS RICH IN METHANE

(75) Inventors: Yonggen Xuan, Hebei (CN); Huazhou Xu, Hebei (CN)

(73) Assignee: XINDI ENERGY ENGINEERING TECHNOLOGY CO., LTD., Langfang, Hebei (CN)

( * ) Notice: Subject to any disclaimer, the term of this patent is extended or adjusted under 35 U.S.C. 154(b) by 331 days.

(21) Appl. No.: 14/345,401

(22) PCT Filed: Sep. 13, 2012

(86) PCT No.: PCT/CN2012/081328
§ 371 (c)(1),
(2), (4) Date: Mar. 17, 2014

(87) PCT Pub. No.: WO2013/044732
PCT Pub. Date: Apr. 4, 2013

(65) Prior Publication Data
US 2014/0345320 A1     Nov. 27, 2014

(30) Foreign Application Priority Data
Sep. 30, 2011   (CN) .......................... 2011 1 0291607

(51) Int. Cl.
*B01D 53/02*     (2006.01)
*F25J 3/06*     (2006.01)
(Continued)

(52) U.S. Cl.
CPC ........... *F25J 3/0635* (2013.01); *B01D 53/0462* (2013.01); *C10L 3/101* (2013.01);
(Continued)

(58) Field of Classification Search
CPC ................... B01D 2256/245; B01D 2257/702; B01D 2257/80; B01D 2259/40001; B01D 2259/402; B01D 2259/416; B01D 53/0423; B01D 53/0462; C10L 2290/08; C10L 2290/12; C10L 2290/541; C10L 2290/542; C10L 2290/543; C10L 3/101; C10L 3/102; C10L 3/106; F25J 3/061; F25J 3/0635; Y02C 20/20
See application file for complete search history.

(56) References Cited

U.S. PATENT DOCUMENTS 2,768,225 A * 10/1956 Moore .................... C07C 11/02
                                                208/122
3,318,103 A *   5/1967   Jakob ..................... F25J 1/0022
                                                62/622
(Continued)

FOREIGN PATENT DOCUMENTS

CN          101260330      9/2008
CN          101508923      8/2009
(Continued)

OTHER PUBLICATIONS

International Search Report of PCT/CN2012/081328 dated Dec. 27, 2012.

*Primary Examiner* — Christopher P Jones
(74) *Attorney, Agent, or Firm* — Rankin, Hill & Clark LLP

(57) ABSTRACT

A process for dehydrating and removing heavy hydrocarbons in the production of liquefied natural gas from a methane-rich gas mixture is disclosed, wherein the methane-rich gas mixture subjected to deacidification treatment is divided into two streams, i.e. the first stream and the second stream, wherein the first stream used as a system process gas is introduced into a drying procedure, and the second stream used as regenerating gas is introduced into a regenerating procedure; the first stream is subjected to a drying treatment, and the moisture and the heavy hydrocarbons are simultaneously removed from the first stream in a composite adsorbent bed(s) of a drying tower, wherein the moisture is removed such that the dew point at normal pressure is ≤−76° C. and the heavy hydrocarbon components of C6 and higher are removed such that the content of these components is ≤217 ppm; and the second stream is used as a regenerating gas in the regenerating procedure of the above-mentioned drying tower, subjected to a regenerating process, and then returned as a part of the system process gas. Comparing to those conventional processes, the present invention can achieve good purifying effect, lower equipment investment and late-stage energy consumption of the system, increase utilization ratio of feed gas, and the operation target of each unit becomes more clear and easy to control. The present invention further relates to an apparatus for carrying out the process.

4 Claims, 1 Drawing Sheet

(51) Int. Cl.
*C10L 3/10* (2006.01)
*B01D 53/04* (2006.01)

(52) U.S. Cl.
CPC ............... *C10L 3/102* (2013.01); *C10L 3/106* (2013.01); *F25J 3/061* (2013.01); *B01D 53/0423* (2013.01); *B01D 2256/245* (2013.01); *B01D 2257/702* (2013.01); *B01D 2257/80* (2013.01); *B01D 2259/40001* (2013.01); *B01D 2259/402* (2013.01); *B01D 2259/406* (2013.01); *C10L 2290/08* (2013.01); *C10L 2290/12* (2013.01); *C10L 2290/541* (2013.01); *C10L 2290/542* (2013.01); *C10L 2290/543* (2013.01); *Y02C 20/20* (2013.01)

(56) References Cited

U.S. PATENT DOCUMENTS

| | | | | |
|---|---|---|---|---|
| 6,023,942 | A * | 2/2000 | Thomas | B23K 9/173 62/613 |
| 6,449,984 | B1 * | 9/2002 | Paradowski | F25J 1/0022 62/613 |
| 6,898,949 | B2 * | 5/2005 | Paradowski | F25J 1/0022 62/613 |
| 2011/0185896 | A1 * | 8/2011 | Sethna | B01D 53/002 95/45 |
| 2013/0090505 | A1 * | 4/2013 | Catchpole | C10L 3/08 585/310 |
| 2014/0208797 | A1 * | 7/2014 | Kelley | B01D 53/0473 62/611 |
| 2015/0352463 | A1 * | 12/2015 | Grave | C10L 3/103 203/14 |

FOREIGN PATENT DOCUMENTS

| | | |
|---|---|---|
| CN | 101596396 | 12/2009 |
| CN | 201692757 | 1/2011 |
| CN | 202297536 | 7/2012 |
| WO | WO2008115079 | 9/2008 |

* cited by examiner

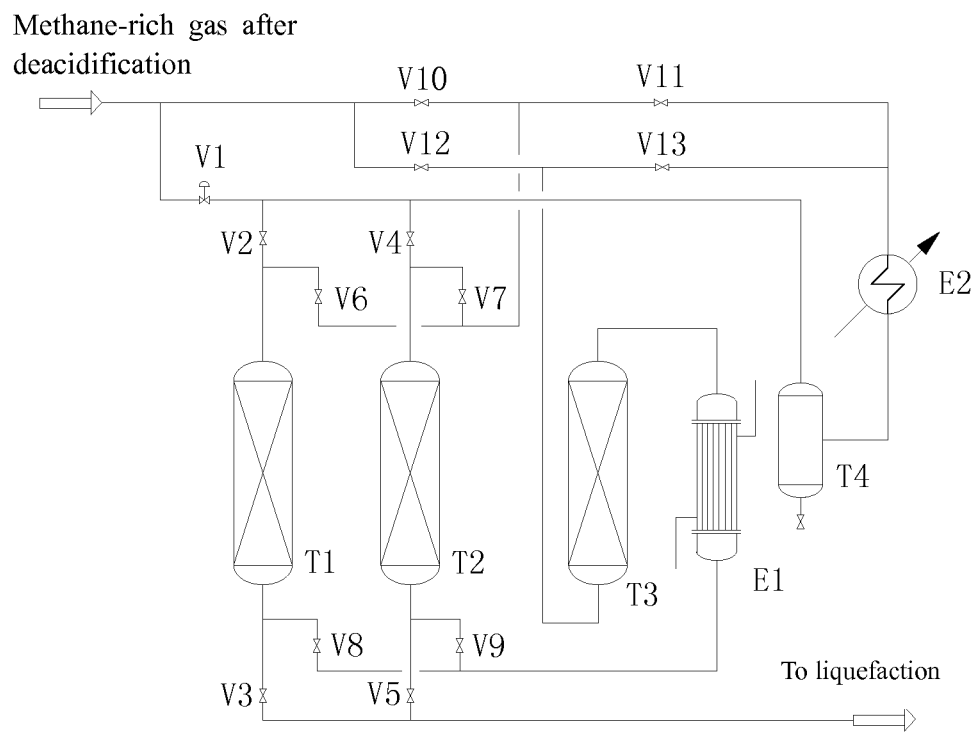

WATER REMOVAL AND HEAVY-HYDROCARBON REMOVAL PROCESS IN LIQUEFIED NATURAL GAS PRODUCTION FROM MIXED GAS RICH IN METHANE

FIELD OF THE INVENTION

The present invention relates to a front-end purifying treatment technology in the methane-rich gas cryogenic liquefaction, more specifically a process for dehydrating and removing heavy hydrocarbons in production of liquefied natural gas (LNG) from a methane-rich gas mixture and an apparatus for this process.

BACKGROUND OF THE INVENTION

Due to the pressure from environment protection and energy source cost, the using proportion of the natural gas, as a kind of primary energy, in various fields of the society is gradually promoted, and the market requirement for natural gas is also rapidly increased. The traditional mode of transportation and supply by pipeline still remains a mainstream, but due to the limitation from gas-feed conditions and consumer distribution, a large part of energy resources cannot be transported by pipeline in long distance, so we have to select a liquefying mode, i.e., we transform the methane gas to a liquid and then use a flexible mode of transportation to transport the liquid to user terminals. The volume of liquefied natural gas (LNG) corresponds to $1/625$ of volume of the same amount of gaseous natural gas, by liquefaction, the cost of storage and transportation can be reduced, and the combustion value of per unit of volume can also be increased.

In a industrial-scale apparatus to obtain liquefied natural gas (LNG) from a methane-rich gas mixture, before performing a cryogenic liquefaction of the gas mixture, the acidic gas components, the water and the high-carbon hydrocarbons ($\geq C6$) etc. contained in the gas mixture must be removed to a degree required by liquefaction, so the stable safety operation of the liquefaction separation process and the apparatus can be ensured. As to the operating conditions of several LNG apparatuses put into service in China, the front-end purifying section of gas mixture usually utilizes an acidic gas removing unit, a drying and adsorbing unit, and a heavy hydrocarbon removing unit, etc. to remove impurity components in successive steps, the drawbacks of these operating conditions consist in that the equipment investment is higher and the energy consumption of the system under normal operating mode is also higher.

SUMMARY OF THE INVENTION

In view of above technical problems, the first aspect of the present invention is to provide a process for dehydrating (i.e., removing water) and removing heavy hydrocarbons in the production of liquefied natural gas from a methane-rich gas mixture, characterized in that:

The methane-rich gas mixture after deacidification (i.e., acidic gas removing) treatment is divided into two streams (or two parts), i.e. the first stream and the second stream, wherein the first stream used as a system process gas (or gas stream, or called as feed gas) is introduced into a drying procedure, and the second stream used as regenerating gas is introduced into a regenerating procedure, The first stream is subjected to a drying treatment, and the moisture and heavy hydrocarbons are simultaneously removed from the first stream in a composite adsorbent bed(s) of a drying tower, wherein the moisture is removed such that the dew point at normal pressure (or atmosphere pressure) is less than or equivalent to (i.e. $\leq$) $-76°$ C. and the heavy hydrocarbon components of C6 and higher (i.e., >C6 or more than 6 carbon atoms) are removed such that the content of these components is $\leq 217$ ppm (preferably $\leq 200$ ppm, more preferably $\leq 100$ ppm, further preferably $\leq 50$ ppm, and most preferably $\leq 10$ ppm); and the second stream (or part) of methane-rich gas mixture is used as a regenerating gas in the regenerating procedure of the above-mentioned drying tower, subjected to a regenerating process and then returned as a part of the system process gas (which will comes into the drying tower under (or at) an adsorption process).

In the present application, "procedure" and "process" have the same meaning and can be used interchangeably.

Preferably, the present invention provides a process for dehydrating and removing heavy hydrocarbons in the production of liquefied natural gas from a methane-rich gas mixture, which is characterized in that:

The methane-rich gas mixture after deacidification treatment is divided by a flow-regulating valve into two streams;

The first stream used as a feed gas (or a process gas) is introduced directly to a first drying tower or a second drying tower under (or at) a drying process, wherein the first drying tower and the second drying tower carry out the drying process and the regenerating process alternatively, a drying agent (such as 3 A or 4 A molecular sieves, and/or activated aluminium oxide) and a heavy hydrocarbon adsorbent (such as activated carbon and/or water-resistant silica gel) loaded in the drying tower under drying process can adsorb the moisture and the heavy hydrocarbons from the first stream, and the dew point under normal pressure of the product gas obtained after the drying process is less than or equivalent to (i.e. $\leq$) $-76°$ C., and the heavy hydrocarbon components of C6 and higher are removed such that the content of these components is $\leq 217$ ppm (preferably $\leq 200$ ppm, more preferably $\leq 100$ ppm, further preferably $\leq 50$ ppm, still further preferably $\leq 30$ ppm, still further preferably $\leq 20$ ppm, most preferably $\leq 10$ ppm);

The second stream is used as a regenerating gas (or called as a gas for regenerating) to carry out a regenerating process in the drying tower(s), wherein the regenerating process in the drying tower(s) include a heating regenerating step and a cold-blowing step;

In the heating-regenerating step, the second stream is dried firstly by the third drying tower and heated by a heater to e.g. 200-300° C. (preferably 210-280° C., more preferably 220-260° C., still preferably 240° C. more or less), and the heated stream is sent to the drying tower which needs regenerating to heat the latter (when the first drying tower is under (or at) drying process, the second drying tower is under regenerating process, vice versa), so the adsorbents loaded in this drying tower is heated up, the moisture and the heavy hydrocarbons are desorbed (or stripped) from the adsorbents, and then, the gas stream that has experienced desorption is cooled and subjected to a liquid-separating operation to obtain a treated gas stream, and the treated stream is converged with the first stream used as the feed gas so as to obtain a mixed gas stream, and the mixed stream is sent to the drying tower under drying process to carry out drying;

In the cold-blowing step, a regenerating gas taken from the methane-rich gas mixture after deacidification treatment is sent directly to the second drying tower or the first drying tower under regenerating process, such that the temperature of the drying tower is lowered by the regenerating gas to normal temperature; the regenerating gas is heated by a heater and then sent to the above-mentioned third drying tower, so as to heat and dry the adsorbents in the third drying tower; and the regenerating gas is cooled and subjected to a liquid-separating operation to obtain a treated gas stream, and the treated stream is mixed with the first stream used as the feed gas so as to obtain a mixed gas stream, and finally the mixed stream is sent to the first drying tower or the second drying tower under drying process to carry out drying.

In general, 3 A molecular sieve, 4 A molecular sieve or activated aluminium oxide can be used as a dehydration adsorbent, while activated carbon or water-resistant silica gel can be used as an adsorbent for removing heavy hydrocarbons.

The another aspect of the present invention is to provide an apparatus for dehydrating and removing heavy hydrocarbons in the production of liquefied natural gas from a methane-rich gas mixture, said apparatus includes:

The first drying tower and the second drying tower, wherein the first drying tower and the second drying tower are under the drying process and the regenerating process alternately or perform the said two process alternately, A third drying tower (i.e., a supplemental drying tower),
A heater,
A gas-liquid separator, and
A Cooler, Every drying tower has one or more composite adsorbent bed(s), for example 3-20 beds, 4-18 beds, 5-16 beds, 6-14 beds or 8-12 beds.

A pipe for supply of the methane-rich gas mixture after deacidification (i.e. the feed gas or the process gas) is divided into two sub-pipes, i.e., a first sub-pipe and a second sub-pipe, the first valve (i.e., flow-regulating valve) is provided in the first sub-pipe; and in the downstream of the first valve, the first sub-pipe is subdivided into three branch pipes, wherein the first branch pipe is connected in order via (or by way of) the second valve, an inlet pipe of the first drying tower (refers to the inlet pipe of the first drying tower when the first drying tower is under drying process), the first drying tower and the third valve to a liquefaction system, the second branch pipe is connected in order via the fourth valve, an inlet pipe of the second drying tower, the second drying tower and the fifth valve to the liquefaction system, and the third branch pipe is connected in order via an optional valve (not shown), an outlet pipe of a gas-liquid separator, the gas-liquid separator, and an inlet pipe of the gas-liquid separator to an outlet port of a cooler;

The above-mentioned second sub-pipe is connected via a tenth valve and an eleventh valve and additionally via a twelfth valve and a thirteenth valve to a inlet pipe of the cooler; a first side tube is branched between the first drying tower and the third valve and also a second side tube is branched between the second drying tower and the fifth valve, the two side tubes are joined together after passed respectively through an eighth valve and a ninth valve and then connected to one end (upper end or lower end) of the heater, and another end of the heater is connected to one end (upper end or lower end) of the third drying tower, while another end of the third drying tower is connected via a pipe to a conduit between the twelfth valve and the thirteenth valve; a third side tube is branched between the first drying tower and the second valve and also a fourth side tube is branched between the second drying tower and the fourth valve, the two side tubes are joined together after passed respectively through a sixth valve and a seventh valve and then connect to a conduit between the tenth valve and the eleventh valve.

Every process may be controlled by means of these valves.

Each adsorbent composite bed of every drying tower may loads, respectively, one or two or more of adsorbents selected from 3 A or 4 A molecular sieve, activated aluminium oxide, activated carbon and water-resistant silica gel, wherein the 3 A molecular sieve, the 4 A molecular sieve or the activated aluminium oxide is used as a dehydrating adsorbent, and the activated carbon or the water-resistant silica gel is used as a heavy hydrocarbon removing adsorbent.

Preferably, every drying tower has at least two composite adsorbent beds which are loaded respectively with a dehydrating adsorbent and a heavy hydrocarbon removing adsorbent, more preferably has three, four, five, six, seven, eight, nine, ten, eleven, twelve, thirteen, fourteen, fifteen or sixteen composite adsorbent beds.

The present invention process for drying/dehydrating and removing heavy hydrocarbons in combination in the production of liquefied natural gas from a methane-rich gas mixture is more simple than the conventional process, and can achieve good purifying effects and reduce energy consumption in the purification process. Furthermore, the operation target of each unit becomes more clear and easy to control.

The process for drying/dehydrating and removing heavy hydrocarbons in combination in the production of liquefied natural gas from a methane-rich gas mixture of the present invention utilizes composite bed(s) to remove the moisture and the heavy hydrocarbons simultaneously; the methane-rich gas mixture after deacidification treatment is subjected continually to the three-tower isobaric drying treatment, and these treatments utilize composite adsorbent bed(s) to remove simultaneously the moisture and the heavy hydrocarbons from the gas mixture stream, wherein the moisture is removed such that the dew point at normal pressure (or atmosphere pressure) is $\leq -76°$ C. and the heavy hydrocarbon components of C6 and higher (i.e., >C6) are removed such that the content of these components is $\leq 217$ ppm (preferably $\leq 200$ ppm, more preferably $\leq 100$ ppm, further preferably $\leq 50$ ppm, still further preferably $\leq 30$ ppm, still further preferably $\leq 20$ ppm, and most preferably $\leq 10$ ppm). A part of methane-rich gas mixture as a regenerating gas is used to carry out regeneration, and then this part of regenerating gas which has finished regenerating process returns to the system process gas.

Advantages of Present Invention

1. By utilizing composite bed(s) to simultaneously remove the moisture and the heavy hydrocarbons, the equipment investment and also late-stage energy consumption of the system can be reduced.

2. As a process of isobaric drying/dehydrating and heavy hydrocarbon removing is used, the absorption, heating and cooling processes of the drying tower can be operated at nearly the same pressure, which increases the service life of the program-controlled valve.

3. Need not to use a purified gas as the regenerating gas and the latter can be taken from the process gas, so the flow scheme of the process become simple, and also the start or stop of the system become convenient in view of the fact that it is a independent system.

4. As we utilize a three-tower flow scheme, and when we carry the cold blowing operation, the heat stored in the heated drying tower is transferred to the next tower, so the energy consumption of the system is low.

BRIEF DESCRIPTION OF THE DRAWING

FIG. 1 is the apparatus for the process of dehydrating and heavy hydrocarbon removing in combination.

THE MODE OF CARRYING OUT THE INVENTION

The present invention provides a process for drying/dehydrating and heavy hydrocarbon removing in combination in the production of liquefied natural gas from a methane-rich gas mixture, wherein the process utilizes the composite adsorbent bed(s) to remove the moisture and the heavy hydrocarbons simultaneously; the methane-rich gas mixture after deacidification treatment is subjected continually to the three-tower isobaric drying treatment, and these treatments utilize composite adsorbent bed(s) to remove simultaneously the moisture and heavy hydrocarbons from the gas mixture stream, wherein the moisture is removed such that the dew point at normal pressure (or atmosphere pressure) is ≤−76° C. and the heavy hydrocarbon components of C6 and higher (i.e., >C6) are removed such that the content of these components is ≤217 ppm (preferably ≤200 ppm, more preferably ≤100 ppm, further preferably ≤50 ppm, and most preferably ≤10 ppm). Further, a part of methane-rich gas mixture as a regenerating gas is used to carry out regeneration, and then this part of regenerating gas which has finished regenerating process returns to the system process gas.

Referring to FIG. 1, an apparatus for dehydrating and removing heavy hydrocarbons in the production of liquefied natural gas from a methane-rich gas mixture of the present invention include:

A first drying tower (T1) and a second drying tower (T2), wherein the first drying tower and the second drying tower are under the drying process and the regenerating process alternately or perform the said two process alternately, A third drying tower (T3) (i.e., a supplemental drying tower), A heater (E1), A gas-liquid separator (T4), and A cooler (E2), Every drying tower has one or more composite adsorbent bed(s), for example 3-20 beds, 4-18 beds, 5-16 beds, 6-14 beds or 8-12 beds, A pipe for supply of the methane-rich gas mixture after deacidification (i.e. the feed gas or the process gas) is divided into two sub-pipes, i.e., a first sub-pipe and a second sub-pipe, the first valve V1 (i.e., flow-regulating valve) is provided in the first sub-pipe; and in the downstream of the first valve V1, the first sub-pipe is subdivided into three branch pipes, wherein the first branch pipe is connected in order via (or by way of) the second valve V2, an inlet pipe of the first drying tower T1 (refers to the inlet pipe of the first drying tower when the first drying tower is under drying process), the first drying tower T1 and the third valve V3 to a liquefaction system, the second branch pipe is connected in order via the fourth valve V4, an inlet pipe of the second drying tower T2, the second drying tower T2 and the fifth valve V5 to the liquefaction system, and the third branch pipe is connected in order via an optional valve (not shown), an outlet pipe of a gas-liquid separator T4, the gas-liquid separator T4, and an inlet pipe of the gas-liquid separator T4 to an outlet port of the cooler E2;

The above-mentioned second sub-pipe is connected via a tenth valve V10 and an eleventh valve V11 and additionally via a twelfth valve V12 and a thirteenth valve V13 to an inlet pipe of the cooler E2; a first side tube is branched between the first drying tower T1 and the third valve V3 and also a second side tube is branched between the second drying tower T2 and the fifth valve V5, the two side tubes are joined together after passed respectively through an eighth valve V8 and a ninth valve V9, and then connected to one end (upper end or lower end) of the heater E1, and another end of the heater E1 is connected to one end (upper end or lower end) of the third drying tower T3, while another end of the third drying tower T3 is connected via a pipe to a conduit between the twelfth valve V12 and the thirteenth valve V13; a third side tube is branched between the first drying tower T1 and the second valve V2 and also a fourth side tube is branched between the second drying tower T2 and the fourth valve V4, the two side tubes are joined together after passed respectively through an sixth valve V6 and a seventh valve V7, and then connected to a conduit between the tenth valve V10 and the eleventh valve V11.

Now referring to FIG. 1, we illustrate the process of drying/dehydrating and removing heavy hydrocarbons in combination:

The apparatus for drying/dehydrating and removing heavy hydrocarbons in combination comprises three drying towers T1, T2 and T3, a heater E1, a cooler E2, a gas-liquid separator T4; among the three drying towers, there are two main drying towers T1 and T2 and one supplemental drying tower T3; the two main drying towers carry out drying and regenerating operation alternately; the regenerating operation include a heating step and a cooling step; the dew point at normal pressure of the obtained product gas which has subjected to drying and heavy hydrocarbons removing operation is less than or equivalent to (i.e., ≤) −76° C., whereas the heavy hydrocarbon components of C6 and higher are removed to a content of ≤217 ppm (preferably ≤200 ppm, preferably ≤100 ppm, further preferably ≤50 ppm, most preferably ≤10 ppm).

In the isobaric process for drying/dehydrating and removing heavy hydrocarbons in combination of the present invention, the regenerating gas is taken from the process gas and, after subjected to regenerating process, is returned to the process gas stream. In comparison to those traditional processes, the process of the present invention can lower the wasting of process gas, and can increase the ratio of liquefaction of the gas stream. As the unit of drying/dehydrating and removing heavy hydrocarbon utilizes composite adsorbent bed(s), it can simultaneously remove the moisture and the heavy hydrocarbons, and can lower the equipment investment and the late-stage system energy consumption. Furthermore, the adsorbing, heating and cooling processes of the drying tower can operate under almost the same pressure, which increases the service life of the equipment.

Now take the adsorption in the drying tower T1 as an example, to illustrate its operating process:

The methane-rich gas mixture after removing acidic gases is firstly divided into two sub-streams, the flow rates of the two sub-stream is regulated by the flow-regulating valve V1: one sub-stream is used as regenerating gas, and another sub-stream is used as mainstream gas (i.e., process gas). The mainstream gas is introduced directly to the drying tower T1 via the valve V2, and the drying agent(s) and the heavy hydrocarbons removing agent(s) loaded in the drying tower T1 can adsorb the moisture and the heavy hydrocarbons contained in the gas stream so as to obtain a purified gas, and then the purified gas is introduced to the successive liquefaction procedure via the valve V3.

Meanwhile another drying tower T2 is under regenerating process, and the regenerating process of the drying tower T2 comprises a heating step and a cold-blowing step:

In the heating/regenerating step, the regenerating gas is passed through the valve V12, the drying tower T3, the heater E1, the valve V9, the drying tower T2, the valve V7, the valve V11, the cooler E2, and the gas-liquid separator T4, and then joined together with the process gas which will enter into the drying tower T1 under (or being subjected to) adsorption process, so as to obtain a joined gas stream. Thereafter, the latter is entered via the valve V2 into the drying tower T1 under adsorption process, in order to achieve the heating process of the drying tower T2.

The regenerating gas is taken from the process gas, the heating/regenerating process needs not any carrier gas of external source, and after the regenerating gas has been subjected to the regenerating step, it will returns to the process gas. The regenerating gas may heat the drying tower T2, at the same time, it may cool the tower T3 for predrying so as to carry the heat accumulated in the adsorbents and other materials in the drying tower T3 away and then enter into the heater E1, thereby the energy consumption for the heating-regenerating can be reduced. The regenerating gas has been subjected to a predrying in the drying tower T3 before it enters into the drying tower T2, therefore the moisture content in the regenerating gas is much lower (the moisture content in the feed gas usually is reduced by 80-99%), such that the drying load of the drying tower T2 can be lowered.

In the cold-blowing step, the regenerating gas is passed through the valve V10, the valve V7, the drying tower T2, the valve V9, the heater E1, the drying tower T3, the valve V13, the cooler E2, and the gas-liquid separator T4 in sequence and then joined together with the process gas which will enter into the drying tower T1 under (or being subjected to) adsorption process, so as to obtain a joined gas stream. The latter is introduced via the valve V2 into the drying tower T1 under adsorption process, in order to achieve the cooling process of the drying tower T2.

In the same way, the regenerating gas is taken from the process gas, the heating-regenerating process needs not any carrier gas of external source, and after the regenerating gas has been subjected to the regenerating step, it will returns to the process gas. The regenerating gas may cool the drying tower T2, at the same time, it may heat the tower T3 for predrying, so as to carry the heat accumulated in the adsorbents and other materials in the drying tower T2 away and then enter into the heater E1, thereby the energy consumption for the heating-regenerating can be reduced. The regenerating gas has been subjected to a predrying in the drying tower T2 before it enters into the drying tower T3, therefore the moisture content in the regenerating gas is much lower, such that the drying load of the drying tower T3 can be lowered.

After the drying tower T2 has been subjected to the above-mentioned heating process and the cooling process, it will wait for the next adsorption operation.

The regenerating process in the drying tower T1 is nearly all the same to that in the drying tower T2, except that the serial numbers of valves to be operated are different. The two drying towers carry out the adsorption and the regeneration alternately, so as to treat the gas mixture by a continuous operation.

The composite bed(s) of each drying tower may load one or more of adsorbents selected from 3 A or 4 A molecular sieve, activated aluminium oxide, activated carbon and silica gel.

Subsequently, take the adsorption in the drying tower T2 as an example, to illustrate its operating process:

The methane-rich gas mixture after removing acidic gases is firstly divided into two sub-streams, the flow rates of the two sub-stream is regulated by flow-regulating valve V1: one sub-stream is used as regenerating gas, and another sub-stream is used as mainstream gas (i.e., process gas). The mainstream gas is introduced directly via the valve V4 to the drying tower T2, and the drying agent(s) and the heavy hydrocarbons removing agent(s) loaded in the drying tower T2 can adsorb the moisture and the heavy hydrocarbons contained in the gas stream so as to obtain a purified gas, and then the purified gas is introduced to the successive liquefaction procedure via the valve V5.

Meanwhile another drying tower T1 is under regenerating process, and the regenerating process of the drying tower T1 comprises a heating step and a cold-blowing step:

In the heating regenerating step, the regenerating gas is passed through via the valve V12, the drying tower T3, the heater E1, the valve V8, the drying tower T1, the valve V6, the valve V11, the cooler E2, and the gas-liquid separator T4 in sequence and then joined together with the process gas which will enter into the drying tower T2 under (or being subjected to) adsorption process, so as to obtain a joined gas stream. Thereafter, the latter is entered via the valve V4 into the drying tower T2 under adsorption process, in order to achieve the heating process of the drying tower T1.

The regenerating gas is taken from the process gas, the heating/regenerating process needs not any carrier gas of external source, and after the regenerating gas has been subjected to the regenerating step, it will returns to the process gas. The regenerating gas may heat the drying tower T1, at the same time, it may cool the tower T3 for predrying so as to carry the heat accumulated in the adsorbents and other materials in the drying tower T3 away and then enter into the heater E1, thereby the energy consumption for the heating-regenerating can be reduced. The regenerating gas has been subjected to a predrying in the drying tower T3 before it enters into the drying tower T1, therefore the moisture content in the regenerating gas is much lower, such that the drying load of the drying tower T1 can be lowered.

In the cold-blowing step, the regenerating gas is passed through the valve V10, the valve V6, the drying tower T1, the valve V8, the heater E1, the drying tower T3, the valve V13, the cooler E2, and the gas-liquid separator T4 in sequence and then joined together with the process gas which will enter into the drying tower T2 under (or being subjected to) adsorption process, so as to obtain a joined gas stream. The latter is introduced via the valve V4 into the drying tower T2 under adsorption process, in order to achieve the cooling process of the drying tower T1.

In the same way, the regenerating gas is taken from the process gas, the heating-regenerating process needs not any carrier gas of external source, and after the regenerating gas has been subjected to the regenerating step, it will returns to the process gas. The regenerating gas may cool the drying tower T1, at the same time, it may heat the tower T3 for predrying so as to carry the heat accumulated in the adsorbents and other materials in the drying tower T1 away and then enter into the heater E1, thereby the energy consumption for the heating-regenerating can be reduced. The regenerating gas has been subjected to a predrying in the drying tower T1 before it enters into the drying tower T3, therefore the moisture content in the regenerating gas is much lower, such that the drying load of the drying tower T3 can be lowered.

After the drying tower T1 has been subjected to the above-mentioned heating process and the cooling process, it will wait for the next adsorption operation.

Each composite bed of every drying tower may load, respectively, one or more of adsorbents selected from 3 A or 4 A molecular sieve, activated aluminium oxide, activated carbon and water-resistant silica gel. Preferably, every drying tower has at least two composite adsorbent beds which are loaded respectively with a dehydrating adsorbent and a heavy hydrocarbon removing adsorbent, more preferably three, four, five, six, seven, eight, nine, ten, eleven, twelve, thirteen, fourteen, fifteen or sixteen composite adsorbent beds.

The invention claimed is:

1. A process for dehydrating and removing heavy hydrocarbons in the production of liquefied natural gas from a methane-rich gas mixture, comprising:

dividing the methane-rich gas mixture subjected to deacidification treatment into two streams, including a first stream and a second stream, wherein the first stream used as a system process gas is introduced into a drying procedure, and the second stream used as regenerating gas is introduced into a regenerating procedure;

subjecting the first stream to a drying treatment, and the moisture and the heavy hydrocarbons are simultaneously removed from the first stream in a composite adsorbent bed(s) of a drying tower, wherein the moisture is removed such that the dew point at normal pressure is $\leq -76°$ C. and the heavy hydrocarbon components of C6 and higher are removed such that the content of these components is $\leq 217$ ppm; and using the second stream as a regenerating gas in the regenerating procedure of the above-mentioned drying tower, subjected to a regenerating process, and then returned as a part of the system process gas, wherein the methane-rich as mixture after deacidification treatment is divided by a flow-regulating valve into two streams;

the first stream used as a process gas is introduced directly to a first drying tower or a second drying tower under a drying process, wherein the first drying tower and the second drying tower carry out the drying process and the regenerating process alternately, a drying agent and a heavy hydrocarbon adsorbent loaded in the drying tower under drying process can adsorb the moisture and the heavy hydrocarbons from the first stream, and the dew point under normal pressure of the product gas obtained after the drying process is less than or equivalent to $-76°$ C., and the heavy hydrocarbon components of C6 and higher are removed such that the content of these components is $\leq 217$ ppm;

the second stream is used as a regenerating gas to carry out a regenerating process in the drying tower(s), wherein the regenerating process in the drying tower include a heating-regenerating step and a cold-blowing step;

in the heating-regenerating step, the second stream is dried firstly by the third drying tower and heated by a heater to 200-300° C., and the heated stream is sent to the first or second drying tower which needs regenerating to heat the drying tower, so the adsorbents loaded in this drying tower are heated up, the moisture and the heavy hydrocarbons are desorbed or stripped from the adsorbents, and then, the gas stream that has experienced desorption is cooled and subjected to a liquid-separating operation to obtain a treated gas stream, and the treated stream is converged with the first stream used as the feed gas so as to obtain a mixed gas stream, and the mixed stream is sent to the drying tower under drying process to carry out drying;

in the cold-blowing step, a regenerating gas taken from the methane-rich gas mixture after deacidification treatment is sent directly to the second drying tower or the first drying tower under regenerating process, such that the temperature of the drying tower is lowered by the regenerating gas to normal temperature; the regenerating gas is heated by a heater and then sent to the third drying tower, so as to heat and dry the adsorbents in the third drying tower; and the regenerating gas is cooled and subjected to a liquid-separating operation to obtain a treated gas stream, and the treated stream is mixed with the first stream used as the process gas so as to obtain a mixed gas stream, and finally the mixed stream is sent to the first drying tower or the second drying tower under drying process to carry out drying.

2. The process according to claim 1, wherein each adsorbent composite bed of every drying tower is loaded with one or more dehydrating adsorbents selected from the group comprising 3 A molecular sieve, 4 A molecular sieve and activated aluminium oxide, and one or more heavy hydrocarbon removing absorbents selected from the group comprising activated carbon and water-resistant silica gel.

3. An apparatus for dehydrating and removing heavy hydrocarbons in the production of a liquefied natural gas from a methane-rich gas mixture, comprising:

a first drying tower and a second drying tower, wherein the first drying tower and the second drying tower are under the drying process and the regenerating process alternately or perform the said two process alternately, a third drying tower, a heater, a gas-liquid separator, and a cooler, wherein each drying tower has one or more of composite adsorbent bed(s), and wherein a pipe for supply of the methane-rich gas mixture after deacidification is divided into two sub-pipes, including a first sub-pipe and a second sub-pipe, a first valve is provided in the first sub-pipe; and in the downstream of the first valve, the first sub-pipe is subdivided into three branch pipes including a first branch pipe, a second branch pipe and a third branch pipe, wherein the first branch pipe is connected in order via a second valve, an inlet pipe of the first drying tower, the first drying tower and a third valve to a liquefaction system, the second branch pipe is connected in order via a fourth valve, an inlet pipe of the second drying tower, the second drying tower and a fifth valve to the liquefaction system, and the third branch pipe is connected in order via an optional valve, an outlet pipe of a gas-liquid separator, the gas-liquid separator, and an inlet pipe of the gas-liquid separator to an outlet port of a cooler;

the second sub-pipe is connected via a tenth valve and an eleventh valve and additionally via a twelfth valve and a thirteenth valve to an inlet pipe of the cooler;

a first side tube is branched between the first drying tower and the third valve and also a second side tube is branched between the second drying tower and the fifth valve, the two side tubes are joined together after passed respectively through an eighth valve and a ninth valve, and then connected to one end of the heater, and another end of the heater is connected to one end of the third drying tower, while another end of the third drying tower is connected via a pipe to a conduit between the twelfth valve and the thirteenth valve; a third side tube is branched between the first drying tower and the second valve and also a fourth side tube is branched between the second drying tower and the fourth valve, the two side tubes are joined together after passed respectively through a sixth valve and a seventh valve, and then connect to a conduit between the tenth valve and the eleventh valve.

4. The apparatus according to claim 3, wherein: each adsorbent composite bed of every drying tower is loaded with one or more dehydrating absorbents selected from the group comprising 3 A molecular sieve; 4 A molecular sieve and actuated aluminium oxide, and one or more heavy hydrocarbon removing absorbents selected from the group comprising activated carbon and water-resistant silica gel.

* * * * *